US006771707B1

(12) United States Patent
Limberg

(10) Patent No.: US 6,771,707 B1
(45) Date of Patent: Aug. 3, 2004

(54) DIGITAL TELEVISION RECEIVER CONVERTING VESTIGIAL-SIDEBAND SIGNALS TO DOUBLE-SIDEBAND AM SIGNALS BEFORE DEMODULATION

(76) Inventor: Allen LeRoy Limberg, 2500 Lakevale Dr., Vienna, VA (US) 22181-4028

(*) Notice: Subject to any disclaimer, the term of this patent is extended or adjusted under 35 U.S.C. 154(b) by 0 days.

(21) Appl. No.: 09/568,732

(22) Filed: May 11, 2000

(51) Int. Cl.[7] ............................................. H04L 27/02
(52) U.S. Cl. ...................... 375/270; 375/277; 375/321; 375/326; 455/47; 455/203; 327/356; 327/357
(58) Field of Search ................................. 375/270, 277, 375/321, 324–327; 455/46, 47, 202, 203, 204, 324; 329/356, 357, 358, 359

(56) References Cited

U.S. PATENT DOCUMENTS 5,378,140 A * 1/1995 Asano et al. ............ 425/451.2
5,673,293 A * 9/1997 Scarpa et al. ............... 375/321
6,356,598 B1 * 3/2002 Wang ......................... 375/321

* cited by examiner

Primary Examiner—Stephen Chin
Assistant Examiner—Dac V. Ha

(57) ABSTRACT

A vestigial-sideband (VSB) signal is down-converted to generate a VSB signal including a carrier frequency offset from zero frequency by an amount greater than the bandwidth of the VSB signal. The carrier of this final I-F signal has a carrier offset from zero-frequency, which carrier offset exceeds the highest modulating frequency of the VSB signal and is adjusted to a prescribed carrier offset value. The down-converted VSB signal is digitized to generate a digital multiplicand signal for a digital multiplier circuit. The digital multiplier circuit is supplied a digital multiplier signal descriptive of a system function composed of a constant term and a second harmonic of the carrier frequency offset from zero frequency. Digital product signal from the digital multiplier circuit is descriptive of a double-sideband amplitude-modulation final I-F signal in the digital regime, which DSB AM final I-F signal is subsequently detected to generate a baseband demodulation result.

11 Claims, 10 Drawing Sheets

Fig. 1 PREVIOUS INVENTION

Fig. 2   PREVIOUS INVENTION

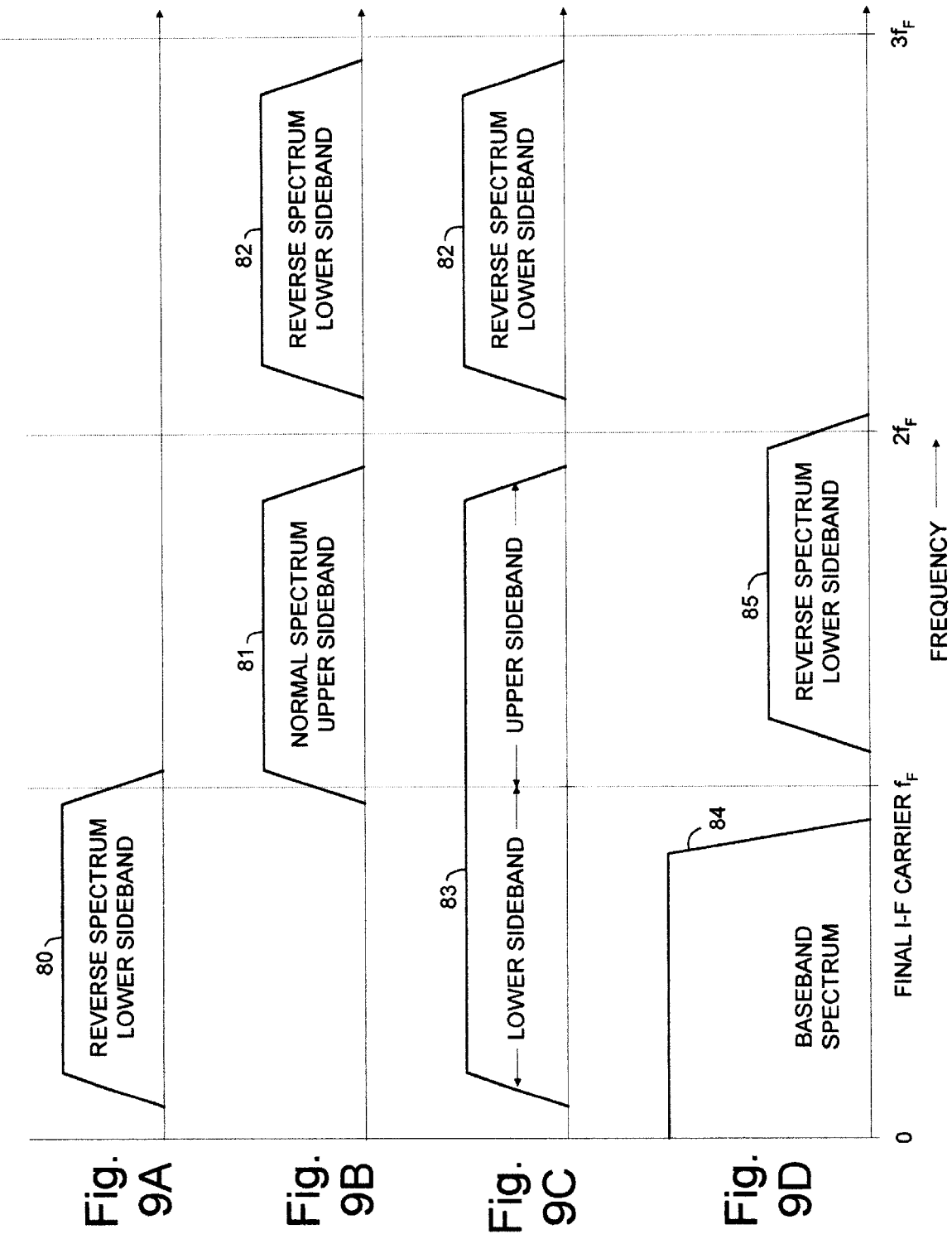

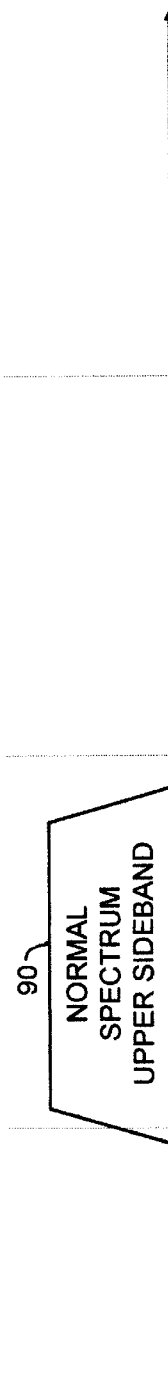
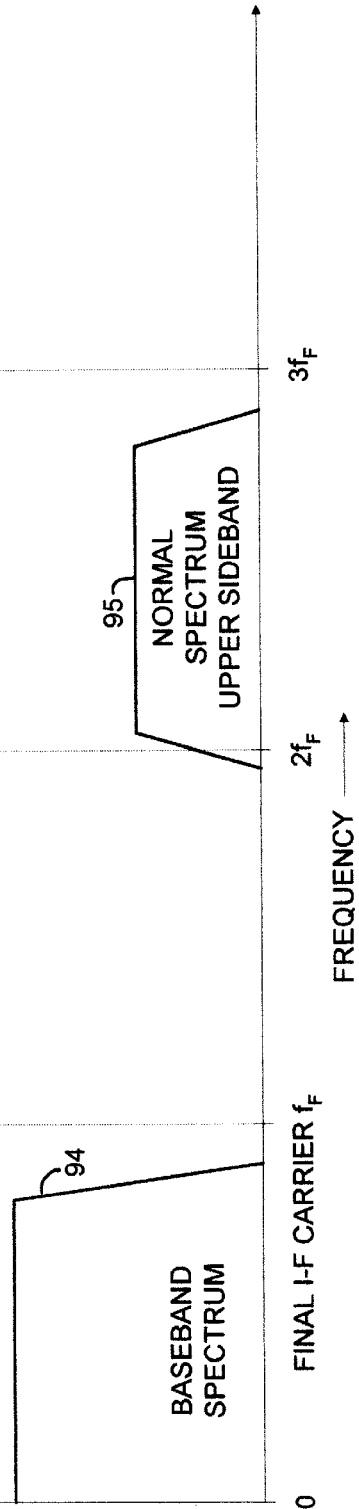
Fig. 10A
Fig. 10B
Fig. 10C
Fig. 10D

DIGITAL TELEVISION RECEIVER CONVERTING VESTIGIAL-SIDEBAND SIGNALS TO DOUBLE-SIDEBAND AM SIGNALS BEFORE DEMODULATION

The invention relates to radio receivers for receiving vestigial-sideband signals, which radio receivers are used in digital television sets, for example.

BACKGROUND OF THE INVENTION

Digital communications frequently employ vestigial-sideband (VSB) signals in which the passband response is reduced at carrier frequency. Excluding from consideration a pilot carrier added to the VSB suppressed-carrier-AM digital television (DTV) signals transmitted in accordance with the 1995 standard for digital television broadcasting established by the Advanced Television Standards Committee (ATSC), the radio-frequency spectrum of the VSB DTV signals exhibits 3 dB roll-off at a carrier frequency 310 khz from the lower frequency bound of the six-megahertz-wide television channels. A problem with VSB signals with roll-off through carrier frequency is that the asymmetry of the modulation sidebands introduces jitter into carrier tracking that is done using variants of the well-known Costas loop. In some digital communications systems the transmitter employs filtering to eliminate modulation sideband energy in the vicinity of the carrier frequency. The ATSC standard does not specifically provide for eliminating modulation sideband energy near the carrier frequency. Instead, a pilot carrier of substantial strength is inserted into the VSB suppressed-carrier-AM DTV signals to reduce the carrier jitter caused by modulation sideband energy near the carrier frequency.

The transient response of synchronous demodulation of VSB signals is notoriously dependent on the roll-off of frequency response through the carrier region in the final I-F signal being synchronously demodulated.

A type of radio receiver design that is employed in digital television sets employs a six-megahertz-wide final intermediate-frequency signal that is offset from zero frequency by no more than a few megaHertz. This VSB final I-F signal is digitized, converted to a complex digital final I-F signal, and then synchrodyned to baseband using a digital complex multiplier. The digital complex multiplier multiplies the complex digital final I-F signal by a complex digital carrier to recover in-phase and quadrature-phase baseband results of the synchrodyne carried out in the digital regime. The in-phase baseband results are used as symbol code input by the symbol decoder of the DTV receiver. The quadrature-phase baseband results are lowpass filtered, and the lowpass filter response is used to control the frequency and phase of local oscillations used in the down conversion to final I-F signal, implementing a procedure known as bandpass tracking. This type of receiver is more fully described in U.S. Pat. No. 5,479,449 issued 26 Dec. 1996 to C. B. Patel and A. L. R. Limberg, entitled "DIGITAL VSB DETECTOR WITH BANDPASS PHASE TRACKER, AS FOR INCLUSION IN AN HDTV RECEIVER", and assigned to Samsung Electronics Co., Ltd. U.S. Pat. No. 5,479,449 describes the carrier of the final I-F signal being below an upper sideband that is synchronously detected in the digital regime to recover baseband symbol code. Such final I-F signal is the result of a downconversion in which a very-high-frequency (VHF) intermediate-frequency signal is heterodyned with local oscillations of a VHF frequency below the VHF I-F signal frequency band. A final I-F signal with the carrier of above a lower sideband is the result of a downconversion in which a very-high-frequency (VHF) intermediate-frequency signal is heterodyned with local oscillations of a VHF frequency above the VHF I-F signal frequency band. This is described in U.S. Pat. No. 5,659,372 issued 19 Aug. 1997 to C. B. Patel and A. L. R. Limberg, entitled "DIGITAL TV DETECTOR RESPONDING TO FINAL-IF SIGNAL WITH VESTIGIAL SIDEBAND BELOW FULL SIDEBAND IN FREQUENCY", and assigned to Samsung Electronics Co., Ltd. U.S. Pat. No. 5,659,372 describes the final I-F signal with the carrier above a lower sideband being synchrodyned to baseband in the digital regime to recover baseband symbol code.

This application incorporates by reference U.S.P.T.O. publication 2003-0224725-A1 published 4 Dec. 2003. The text and drawing of this publication corresponds to the text and drawing of U.S. patent application Ser. No. 09/440,469 titled "DIGITAL TELEVISION RECEIVER CONVERTING VESTIGIAL-SIDEBAND SIGNALS TO DOUBLE-SIDEBAND AM SIGNALS BEFORE DEMODULATION", filed for A. L. R. Limberg 15 Nov. 1999 and assigned to Samsung Electronics Co., Ltd. U.S.P.T.O. publication 2003-0224725-A1 describes a VSB signal being downconverted to a double-sideband amplitude-modulation final I-F signal that is subsequently detected to generate a baseband demodulation result. The carrier of the final intermediate-frequency signal has a carrier offset from zero-frequency, which carrier offset exceeds the highest modulating frequency of the VSB signal and is adjusted to a prescribed carrier offset value.

The downconversion to the DSB AM I-F signal is accomplished in certain embodiments of the invention described in U.S.P.T.O. publication 2003-0224725-A1 by heterodyning the VSB signal with a heterodyning signal essentially consisting of first and second frequency components. The first frequency component of the heterodyning signal is lower in frequency than the carrier of the VSB signal by an amount equal to the carrier offset value prescribed for the final I-F signal. The second frequency component of the heterodyning signal is higher in frequency than the carrier of the VSB signal by an amount equal to the carrier offset value prescribed for the final I-F signal. In preferred ones of these embodiments of the invention described in U.S.P.T.O. publication 2003-0224725-A1, the heterodyning signal is generated by a balanced modulator providing suppressed-carrier amplitude-modulation of oscillations supplied from a controlled local oscillator. The modulation of these local oscillations by the balanced modulator is in response to a modulating signal of a frequency equal to the carrier offset value prescribed for the final I-F signal. There is automatic frequency and phase control (AFPC) of the local oscillations that the controlled local oscillator supplies. The AFPC is responsive to the departure of the carrier of the final I-F signal from its prescribed value of offset from zero frequency. The DSB AM final I-F signal is demodulated using an in-phase synchronous detector for recovering baseband symbol code and a quadrature-phase synchronous detector for developing AFPC signal for the controlled local oscillator.

The downconversion to the DSB AM I-F signal is accomplished in other embodiments of the invention described in U.S.P.T.O. publication 2003-0224725-A1 by downconverting the VSB signal conventionally, to generate a VSB signal including a carrier frequency offset from zero frequency by an amount greater than the bandwidth of the VSB signal. The downconverted VSB signal is digitized. Then, the digitized downconverted VSB signal is multiplied by a second harmonic of the carrier to generate another VSB signal, and the two digitized VSB signals are added together to complete generation of the DSB AM signal in the digital regime.

SUMMARY OF THE INVENTION

In the invention disclosed herein, the downconversion to the DSB AM I-F signal is accomplished by downconverting the VSB signal conventionally, to generate a VSB signal including a carrier frequency offset from zero frequency by an amount greater than the bandwidth of the VSB signal; and the downconverted VSB signal is digitized. In the invention disclosed herein the digitized downconverted VSB signal is a digital multiplicand signal which a digital multiplier circuit multiplies by a digital multiplier signal to generate a digital product signal descriptive of the DSB AM signal in the digital regime. This digital multiplier signal describes a system function composed of a constant term and a second harmonic of the carrier frequency offset from zero frequency.

BRIEF DESCRIPTION OF THE DRAWING

FIGS. 9A, 9B, 9C and 9D are frequency spectrum plots against the same frequency abscissa showing a first way of converting a VSB AM signal to a DSB AM signal and then demodulating it to recover baseband signal.

FIGS. 10A, 10B, 10C and 10D are frequency spectrum plots against the same frequency abscissa showing a second way of converting a VSB AM signal to a DSB AM signal and then demodulating it to recover baseband signal, which second way of converting a VSB AM signal to a DSB AM signal and then demodulating it is preferred over the first way illustrated in FIGS. 9A, 9B, 9C and 9D.

DETAILED DESCRIPTION

Figure 1:
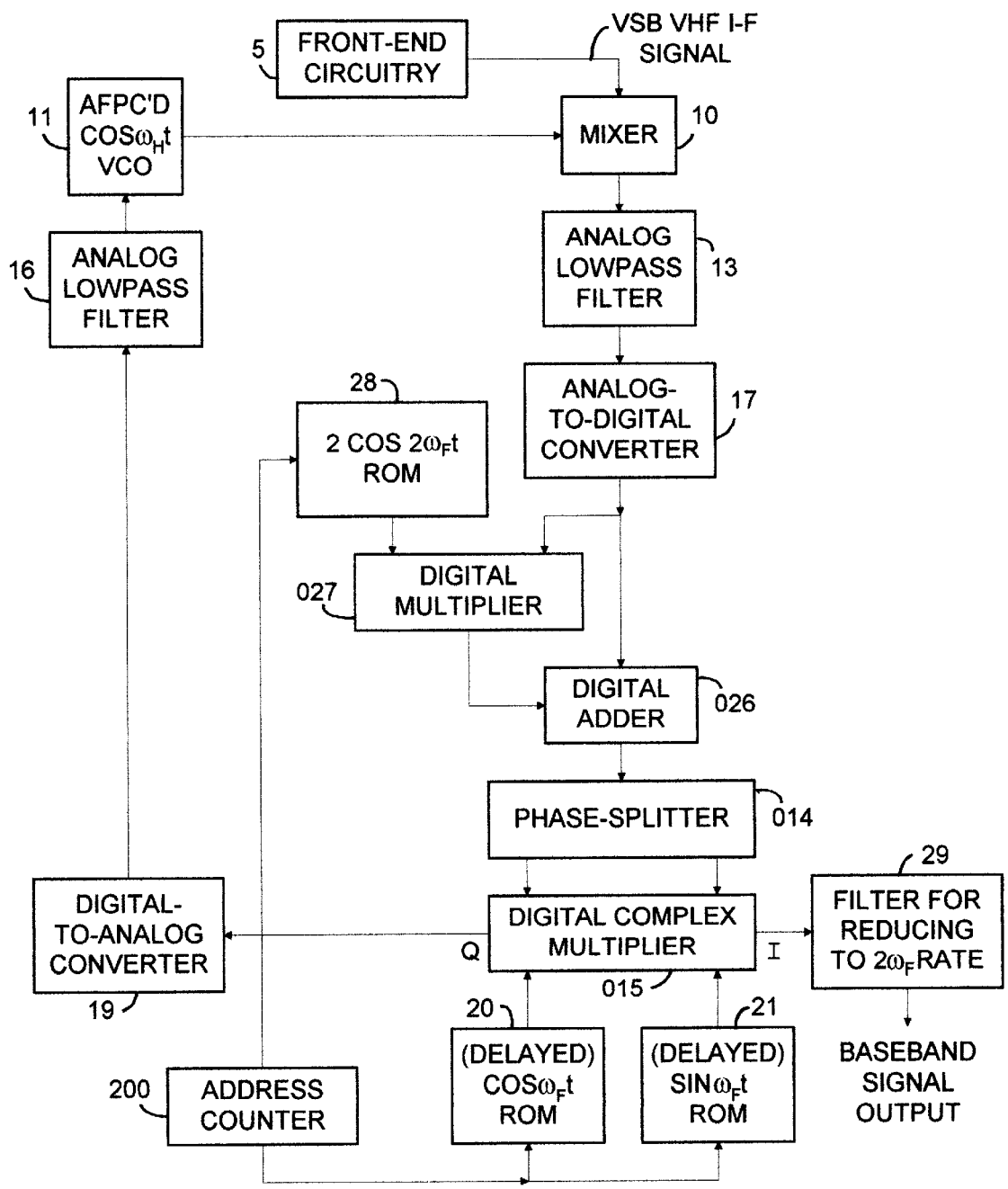
FIG. 1 is a block schematic diagram of apparatus for demodulating a vestigial-sideband amplitude-modulation signal, which apparatus down-converts a VSB AM signal to generate a DSB AM signal and is described in U.S.P.T.O. publication 2003-0224725-A1.

FIG. 1 shows a portion of a VSB radio signal receiver including receiver front-end circuitry 5 for converting a received vestigial-sideband signal to an amplified vestigial-sideband signal in a penultimate intermediate-frequency band. This penultimate I-F band is preferably in the very-high-frequency (VHF) portion of the spectrum, extending from 41 to 47 megahertz, by way of example. In such case, the front-end circuitry 5 includes the customary gain-controlled VHF intermediate-frequency amplifier chain, which amplifier chain supplies VSB amplified VHF I-F signal to a mixer 10 for downconversion to a final I-F signal. A voltage-controlled oscillator (VCO) 11 is designed for operation as a controlled local oscillator with automatic frequency and phase control of its oscillations at a very high frequency $f_H$. The VCO 11 supplies its oscillations to the mixer 10 for multiplying the VSB amplified VHF I-F signal; and the resulting product output signal from the mixer 10 is lowpass filtered by a lowpass filter 13 to separate a VSB final I-F signal with carrier frequency $f_f$ from its image in the VHF band. (That is, the lowpass filter 13 operates as a final-intermediate-frequency-band selection filter, which in some designs might be replaced by a bandpass filter.) The lowpass filter 13 response $R_{13}$ is digitized by an analog-to-digital converter 17.

The resulting digitized VSB final I-F signal is applied as a first of its two summand input signals to a digital adder 026 and is applied as a multiplicand input signal to a digital multiplier 027. The sum output signal supplied by the adder 26 is a DSB AM signal generated by combining two VSB signals received as summand input signals, one VSB signal providing the lower sideband of that DSB AM signal, and the other VSB signal providing the upper sideband of that DSB AM signal. The lowpass filter 13 response is one of the two summand input signals of the adder 26. The other summand input signal of the adder 26 is the product output signal of a digital multiplier 027, which modulates a suppressed carrier frequency $2f_f$ in accordance with the lowpass filter 13 response. More specifically, the digital multiplier 027 multiplies a multiplicand input signal, as supplied from a read-only memory 28 storing a 2 cos $2\omega_F$ t look-up table, by the lowpass filter 13 response applied to the digital multiplier 027 as a multiplier input signal. The DSB AM signal that the adder 026 generates as its sum output signal is supplied to a digital phase-splitter 014 that converts the real signal to a complex signal having real and imaginary components supplied to a digital complex multiplier 015 as a complex multiplicand signal. The complex multiplier 015 synchrodynes this complex multiplicand signal with a digitized final I-F carrier signal supplied to the complex multiplier 015 as a complex multiplier signal.

The real and imaginary components of this complex multiplier signal are respectively supplied from a read-only memory 20 storing a cos $\omega_F$ t look-up table and from a read-only memory 21 storing a sin $\omega_F$ t look-up table. The ROMs 20, 21 and 28 are addressed from a common address counter 200 counting at the sample rate used by the digital complex multiplier 015. The cos $\omega_F$ t and sin $\omega_F$ t look-up tables stored in the ROMs 20 and 21 are delayed respective to the 2 cos $2\omega_F$ t look-up table stored in the ROM 28, to compensate for the latent delays of the digital multiplier 027, the digital adder 026, the phase-splitter 014 and the digital complex multiplier 015.

The resulting complex product supplied from the complex multiplier 015 has an in-phase baseband component, I. The in-phase baseband component I is a demodulation result descriptive of the modulating signal used in generating the transmitted VSB signal currently being received. A decimation filter 29 reduces the sampling rate of the in-phase baseband component I to Nyquist rate and suppresses in its output response those frequency components of system response above $2\omega_F$ in frequency.

The complex product supplied from the complex multiplier 015 also has a quadrature-phase baseband component, Q. The quadrature-phase baseband component Q is supplied to a digital-to-analog converter 19 to generate analog input signal applied to an analog lowpass filter 16. The response of the lowpass filter 16 is applied to the VCO 11 as an automatic frequency and phase control (AFPC) signal.

In the FIG. 1 downconversion circuitry, the response $R_{10}$ from the mixer 10 will be an ensemble of terms each of a form per the following equation (1), presuming the VCO 11 to be of the form $\cos \omega_H t$.

$$R_{10} = 0.5\cos(\omega_H - \omega_V)t + 0.5\cos(\omega_H + \omega_V)t \qquad (1)$$

The lowpass filter 13 suppresses the high frequency terms in its response $R_{13}$ to the mixer 10 response $R_{10}$, to generate an ensemble of terms each per the following equation (2).

$$R_{13} = 0.5\cos(\omega_H - \omega_V)t \qquad (2)$$

The digital multiplier 027 modulates a suppressed $2 \cos 2 \omega_F t$ carrier by the lowpass filter 13 response $R_{13}$, as those system function are expressed in digitized form, to generate a digital multiplier 027 system response $R_{027}$ that is an ensemble of terms each per the following equation (3).

$$R_{027} = 0.5\cos(2\omega_F + \omega_H - \omega_V)t + 0.5\cos(2\omega_F - \omega_H + \omega_V)t \qquad (3)$$

The digital adder 26 sums digitized $R_{13}$ and $R0_{27}$ to generate a sum output signal $R_{026}$ as a system response composed of an ensemble of terms each per the following equation (4).

$$\begin{aligned} R_{026} &= R_{13} + R_{027} \\ &= 0.5\cos(\omega_H - \omega_V)t + \\ &\quad 0.5\cos(2\omega_F - \omega_H - \omega_V)t + 0.5\cos(2\omega_F - \omega_H + \omega_V)t \end{aligned} \qquad (4)$$

The phase-splitter 014 repeats the adder 026 response $R0_{26}$ as its real response $\mathrm{Re}_{014}$, an ensemble of terms each per the following equation (5), and generates its imaginary response $\mathrm{Im}_{014}$, an ensemble of corresponding terms each per the following equation (6).

$$\mathrm{Re}_{014} = 0.5\cos(\omega_H - \omega_V)t + \\ 0.5\cos(2\omega_F + \omega_H - \omega_V)t + 0.5\cos(2\omega_F - \omega_H + \omega_V)t \qquad (5)$$

$$\mathrm{Im}_{014} = 0.5k\sin(\omega_H - \omega_V)t + \\ 0.5\sin(2\omega_F + \omega_H - \omega_V)t + 0.5\sin(2\omega_F - \omega_H + \omega_V)t \qquad (6)$$

The following equations (7) describe the quadrature-phase response Q of the digital complex multiplier 015.

$$\begin{aligned} Q &= \mathrm{Re}_{014}\sin\omega_F t - \mathrm{Im}_{014}\cos\omega_F t \\ &= 0.5 \cos(\omega_H - \omega_V)t * \sin\omega_F t + \\ &\quad 0.5 \cos(2\omega_F + \omega_H - \omega_V)t * \sin\omega_F t + \\ &\quad 0.5 \cos(2\omega_F - \omega_H + \omega_V)t * \sin\omega_F t - \\ &\quad 0.5 \sin(\omega_H - \omega_V)t * \cos\omega_F t - \\ &\quad 0.5 \sin(2\omega_F + \omega_H - \omega_V)t * \cos\omega_F t - \\ &\quad 0.5 \sin(2\omega_F - \omega_H + \omega_V)t * \cos\omega_F t \\ &= 0.5[\cos(\omega_H - \omega_V)t * \sin\omega_F t - \sin(\omega_H - \omega_V)t * \cos\omega_F t] + \\ &\quad 0.5[\cos(2\omega_F + \omega_H - \omega_V)t * \sin\omega_F t - \\ &\quad \sin(2\omega_F + \omega_H - \omega_V)t * \cos\omega_F t] + \\ &\quad 0.5[\cos(2\omega_F - \omega_H + \omega_V)t * \sin\omega_F t - \\ &\quad \sin(2\omega_F - \omega_H + \omega_V)t * \cos\omega_F t] \\ &= +0.5 \sin(\omega_F - \omega_H + \omega_V)t + \\ &\quad 0.5 \sin(\omega_F + \omega_H - \omega_V)t + \\ &\quad 0.5 \sin(\omega_F - \omega_H + \omega_V)t \\ &= \sin(\omega_F - \omega_H + \omega_V)t + 0.5 \sin(\omega_F + \omega_H - \omega_V)t \end{aligned} \qquad (7)$$

Presuming $(\omega_H - \omega_V)$ to be approximately $\omega_F$, the lowpass filter 16 suppresses the higher frequency $\cos 0.5 \sin (\omega_F + \omega_H - \omega_V)t$ component of the Q signal, to generate a response $R_{16}$ that within the AFPC bandwidth is an ensemble of terms each per the following equation (8).

$$R_{16} = \sin(\omega_F - \omega_H + \omega_V)t \qquad (8)$$

$R_{16}$ is an AFPC signal that will adjust $\omega_H$ so that $(\omega_H - \omega_V)$ equals $\omega_F$ to reduce error signal substantially to zero.

The following equations (9) describe the in-phase response I of the digital complex multiplier 015.

$$\begin{aligned} I &= \mathrm{Re}_{014}\cos\omega_F t + \mathrm{Im}_{014}\sin\omega_F t \\ &= +0.5 \cos(\omega_H - \omega_V)t * \cos\omega_F t + \\ &\quad 0.5 \cos(2\omega_F + \omega_H - \omega_V)t * \cos\omega_F t + \\ &\quad 0.5 \cos(2\omega_F - \omega_H + \omega_V)t * \cos\omega_F t + \\ &\quad 0.5 \sin(\omega_H - \omega_V)t * \sin\omega_F t + \\ &\quad 0.5 \sin(2\omega_F + \omega_H - \omega_V)t * \sin\omega_F t + \\ &\quad 0.5 \sin(2\omega_F - \omega_H + \omega_V)t * \sin\omega_F t \\ &= +0.5[\cos(\omega_H - \omega_V)t * \cos\omega_F t + \sin(\omega_H - \omega_V)t * \sin\omega_F t] + \\ &\quad 0.5[\cos(2\omega_F + \omega_H - \omega_V)t * \cos\omega_F t + \\ &\quad \sin(2\omega_F + \omega_H - \omega_V)t * \sin\omega_F t] + \\ &\quad 0.5[\cos(2\omega_F - \omega_H + \omega_V)t * \cos\omega_F t + \\ &\quad \sin(2\omega_F - \omega_H + \omega_V)t * \sin\omega_F t] \\ &= +0.5 \cos(\omega_F - \omega_H + \omega_V)t + \\ &\quad 0.5 \cos(\omega_F + \omega_H - \omega_V)t + \\ &\quad 0.5 \cos(\omega_F - \omega_H + \omega_V)t \\ &= \cos(\omega_F - \omega_H + \omega_V)t + 0.5 \cos(\omega_F + \omega_H - \omega_V)t \end{aligned} \qquad (9)$$

Suppose that $(\omega_V - \omega_H)$ exhibits variation of higher frequency than the AFPC time constant. Each component of the ensemble descriptive of these variations is assumed to have a $(\omega_H - \omega_V)$ value of $(\omega_F + \omega_M)$. When the AFPC loop is phase-locked, the in-phase response I of the complex multiplier 015 will be an ensemble of the following component I responses, as determined by substituting $(\omega_F + \omega_M)$ for $(\omega_H - \omega_V)$ in equation (9).

$$I = \cos(-\omega_M)t + 0.5\cos(2\omega_F + \omega_M)t \qquad (10)$$
$$= \cos\omega_M t + 0.5\cos(2\omega_F + \omega_M)t$$

The rate-reduction filter 29 with $2\omega_F$ output sample rate receives this in-phase response I and aliases the sideband of the $\cos 2\omega_F t$ carrier to baseband to augment the baseband signal.

Figure 2:
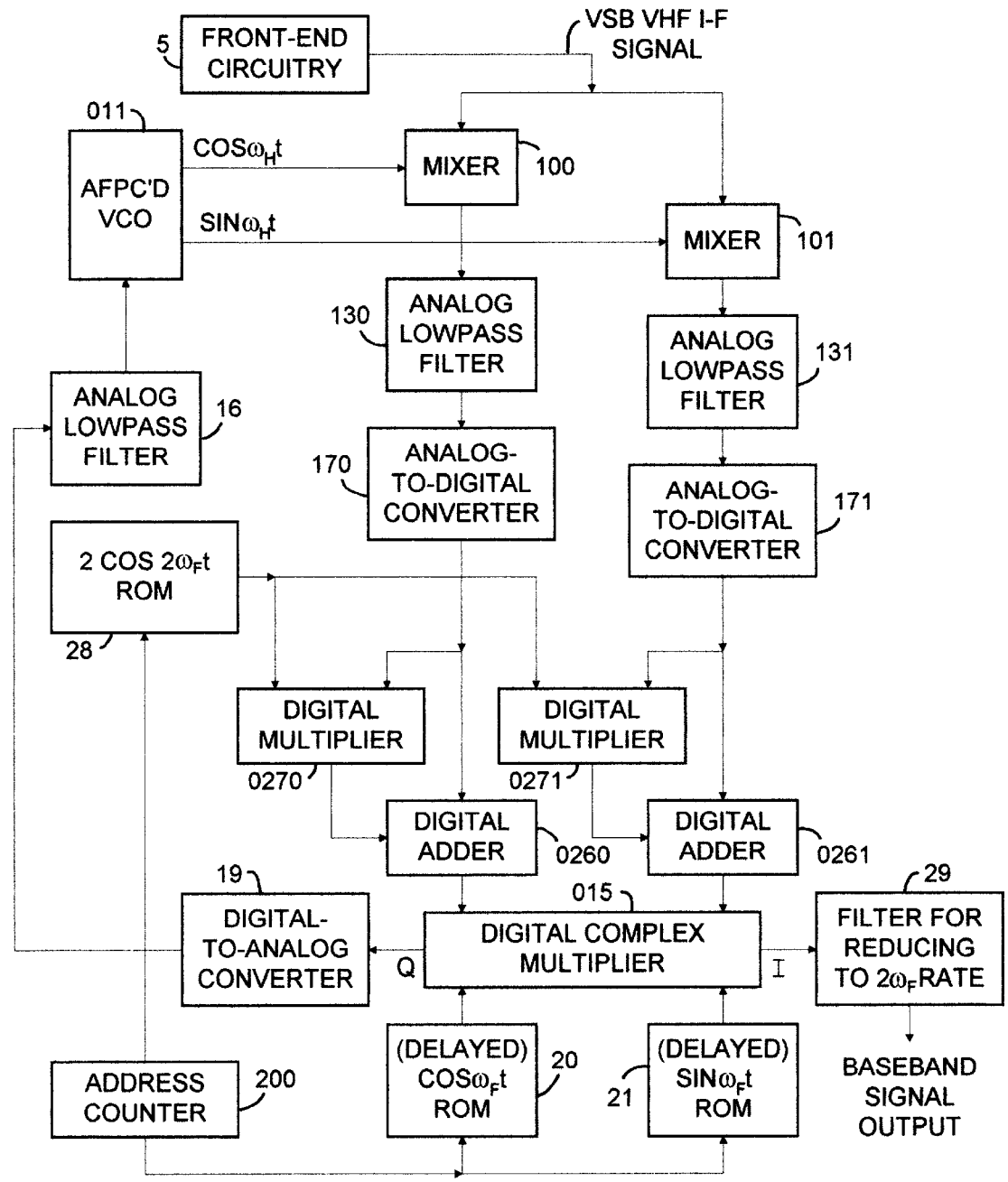
FIG. 2 is a block schematic diagram of apparatus for demodulating a VSB signal with a digital complex multiplier after the VSB signal is converted to DSB AM signals by a complex down-conversion, which apparatus is also described in U.S.P.T.O. publication 2003-0224725-A1.

FIG. 2 shows a modification of the FIG. 1 portion of a VSB radio signal receiver that uses a complex mixer instead of the mixer 10 for downconverting VSB VHF I-F signal to VSB final I-F signal. This avoids the need for the phase-splitter 014 before the digital complex multiplier 015 used for demodulation. The complex mixer comprises component mixers 100 and 101 having their respective output signals filtered by lowpass filters 130 and 131, respectively. The responses of the lowpass filters 130 and 131 are digitized by analog-to-digital converters 170 and 171, respectively. The digitized lowpass filter 130 response supplied from the ADC 170 is applied as the first of two summand input signals to a digital adder 0260. The other summand input signal of the adder 0260 is the product output signal of a digital multiplier 0270. The digital multiplier 0270 multiplies a multiplicand input signal supplied from the ROM 28, which multiplicand input signal describes a $2 \cos 2\omega_F t$ system function, by the digitized lowpass filter 130 response as multiplier input signal. The sum output signal that the adder 0260 generates includes DSB AM of a $\omega_F$ carrier and is supplied to the digital complex multiplier 015 as a real component of final I-F input signal. The digitized lowpass filter 131 response supplied from the ADC 171 is applied as the first of two summand input signals to a digital adder 0261. The other summand input signal of the adder 0261 is the product output signal of a digital multiplier 0271. The digital multiplier 0271 multiplies a multiplicand input signal supplied from the ROM 28, which multiplicand input signal describes a $2 \cos 2\omega_F t$ system function, by the digitized lowpass filter 131 response as multiplier input signal. The sum output signal that the adder 0261 generates includes DSB AM of a $\omega_F$ carrier and is supplied to the digital complex multiplier 015 as an imaginary component of final I-F input signal.

The mixers 100 and 101 receive similar VSB amplified VHF I-F signals as respective multiplicand input signals to be downconverted, which VSB signals can be supplied from the customary gain-controlled VHF I-F amplifier chain. The FIG. 1 VCO 11 supplying $\cos \omega_H t$ real or in-phase local oscillations is replaced in FIG. 2 by a VCO 011 supplying $\sin \omega_H t$ imaginary or quadrature-phase local oscillations, as well as supplying $\cos \omega_H t$ real or in-phase local oscillations. The $\cos \omega_H t$ in-phase local oscillations from the VCO 011 are applied as multiplier input signal to the component mixer 100. The operation of the mixer 100, the lowpass filter 130, the ADC 170, the adder 0260 and the multiplier 0270 in the portion of a VSB signal receiver shown in FIG. 2 corresponds with the operation of the mixer 10, the lowpass filter 13, the ADC 17, the adder 26 and the multiplier 27 in the portion of a VSB signal receiver shown in FIG. 2. So, in accordance with equation (4) the sum output signal $R_{0260}$ from the adder 0260 is an ensemble of terms each per the following equation (11).

$$R_{0260} = R_{130} + R_{0270} \qquad (11)$$
$$= 0.5\cos(\omega_H - \omega_V)t +$$
$$0.5\cos(2\omega_F + \omega_H - \omega_V)t + 0.5\cos(2\omega_F - \omega_H + \omega_V)t$$

The $\sin \omega_H t$ in-phase local oscillations from the VCO 011 are applied as multiplier input signal to the component mixer 101. The response $R_{101}$ from the mixer 101 will be an ensemble of terms each of the following form, presuming the VCO 111 to be of the form $\cos \omega_H t$.

$$R_{101} = 0.5\sin(\omega_H - \omega_V)t + 0.5\sin(\omega_H + \omega_V)t \qquad (12)$$

The lowpass filter 131 suppresses the high frequency terms in its response $R_{131}$ to the mixer 101 response $R_{101}$, to generate an ensemble of terms each per the following equation (13).

$$R_{131} = 0.5\sin(\omega_H - \omega_V)t \qquad (13)$$

The digital multiplier 0271 modulates a suppressed $2 \cos 2\omega_F t$ carrier by the lowpass filter 131 response $R_{131}$ to generate in its response $R_{0271}$ an ensemble of terms each per the following equation (14).

$$R_{0271} = 0.5\sin(2\omega_F + \omega_H - \omega_V)t + 0.5\sin(2\omega_F - \omega_H + \omega_V)t \qquad (14)$$

The adder 0261 sums $R_{131}$ and $R_{0271}$ to generate a sum output signal $R_{0261}$ which is an ensemble of terms each per the following equation (15).

$$R_{0261} = R_{131} + R_{0271} \qquad (15)$$
$$= 0.5\sin(\omega_H - \omega_V)t +$$
$$0.5\sin(2\omega_H - \omega_H - \omega_V)t + 0.5\sin(2\omega_F - \omega_H + \omega_V)t$$

The adder 0260 response $R_{0260}$ in equation (13) and the adder 0261 response $R_{0261}$ in equation (15) respectively correspond to the real response $Re_{014}$ of the phase-splitter 014 per equation (5) and to the imaginary response $Im_{014}$ of the phase-splitter 014 per equation (6).

Figure 3:
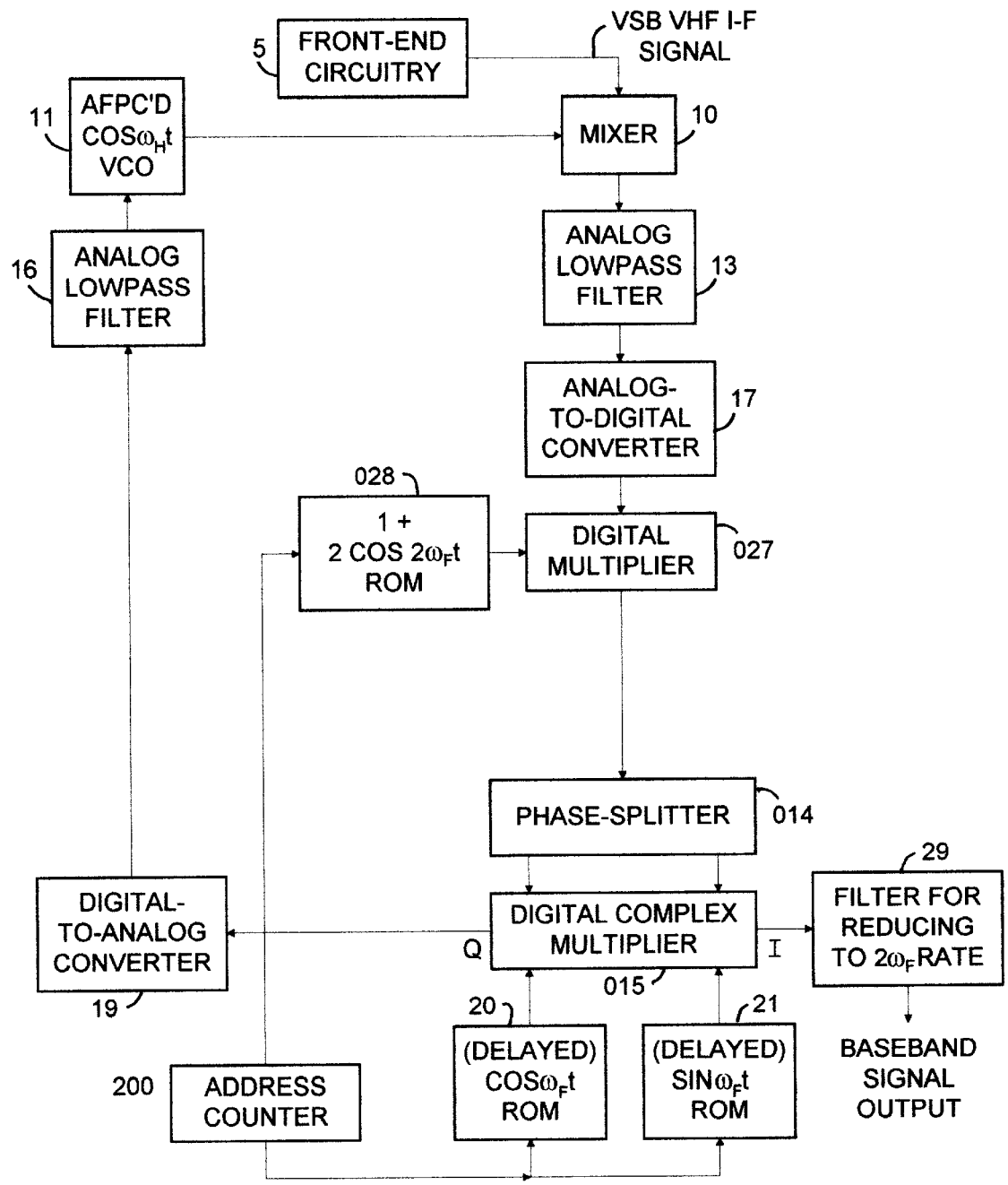
FIG. 3 is a block schematic diagram of apparatus for demodulating a VSB AM signal in accordance with an invention first disclosed herein, which apparatus down-converts a VSB AM signal to generate a DSB AM signal and phase-splits the DSB AM signal as applied to a complex multiplier for demodulation by synchrodyne to baseband.

FIG. 3 shows modifications made in accordance with the invention to the FIG. 1 portion of a VSB radio signal receiver. In FIG. 3 the digital adder 026 is deleted from the receiver, and the digital multiplier 027 is connected to apply its product output signal directly to the phase-splitter 014 as input signal thereto. FIG. 3 also shows the ROM 28, which stores the look-up table for a $2 \cos 2\omega_F t$ system function applied to the digital multiplier 027 as multiplicand input signal, being replaced with a read-only memory 028, which stores a look-up table for a $1+2 \cos 2\omega_F t$ system function applied to the digital multiplier 027 as multiplicand input signal.

Figure 4:
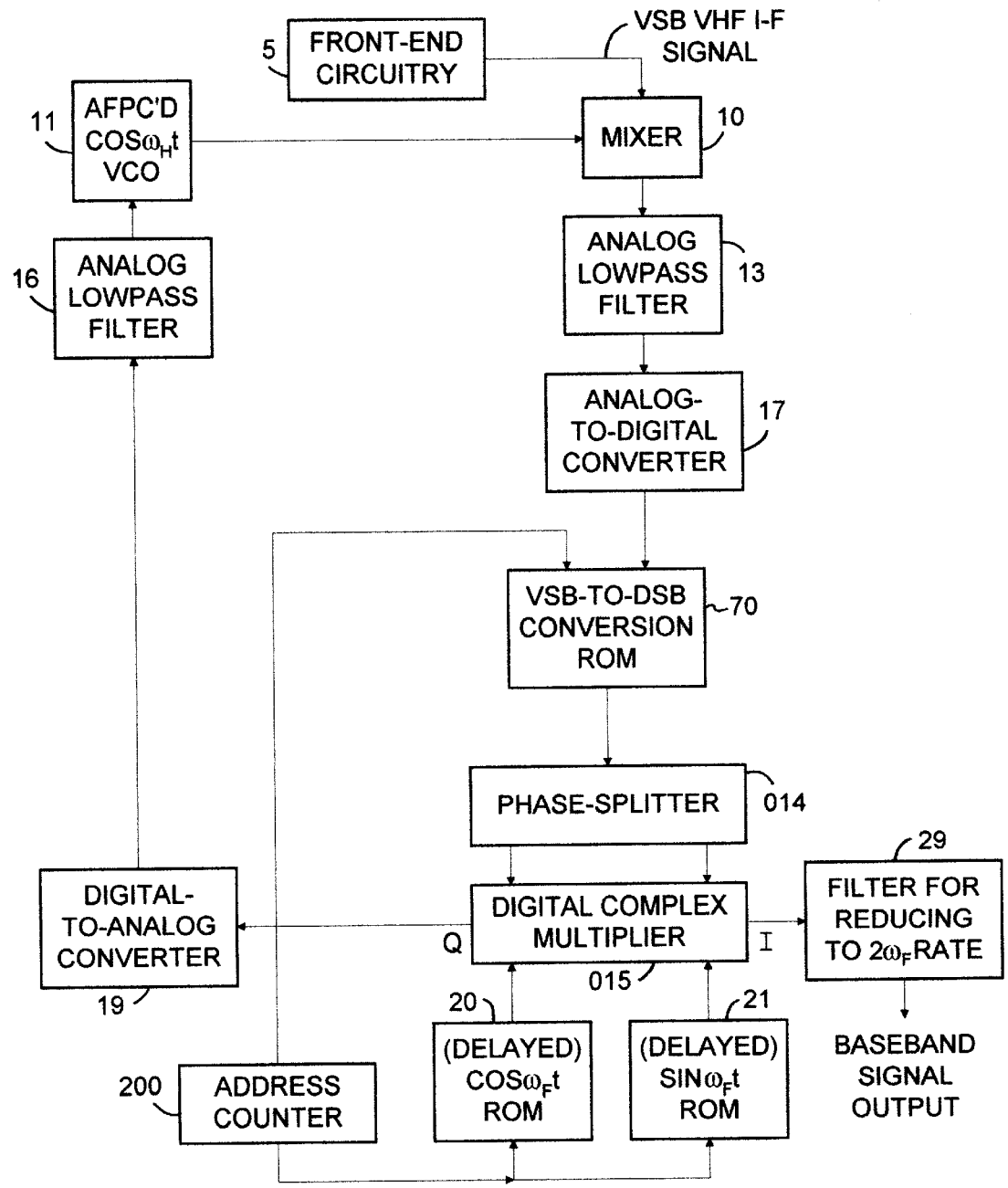
FIG. 4 is a block schematic diagram of a modification of the FIG. 3 apparatus for demodulating a VSB AM signal, which modified apparatus embodies an invention first disclosed herein.

FIG. 4 shows modifications made in accordance with the invention to the FIG. 1 portion of a VSB radio signal receiver. These modifications are alternative to the FIG. 3 modification of the FIG. 1 portion of a VSB radio signal receiver, but are more easily explained as modifications to the FIG. 3 portion of a VSB radio signal receiver. In certain embodiments of the FIG. 3 portion of a VSB radio signal receiver, the digital multiplier 027 can be constructed in read-only memory. FIG. 4 shows the ROM 028 and the digital multiplier 027 constructed in ROM being replaced by a single read-only memory 70 for converting digitized VSB final I-F signal from the ADC 17 to digitized DSB AM final I-F signal supplied as input signal to the phase-splitter 014. The ROM 70 receives sample count from the address counter 200 as part of its input address and receives digitized VSB final I-F signal from the ADC 17 as the restt of its input address.

Figure 5:
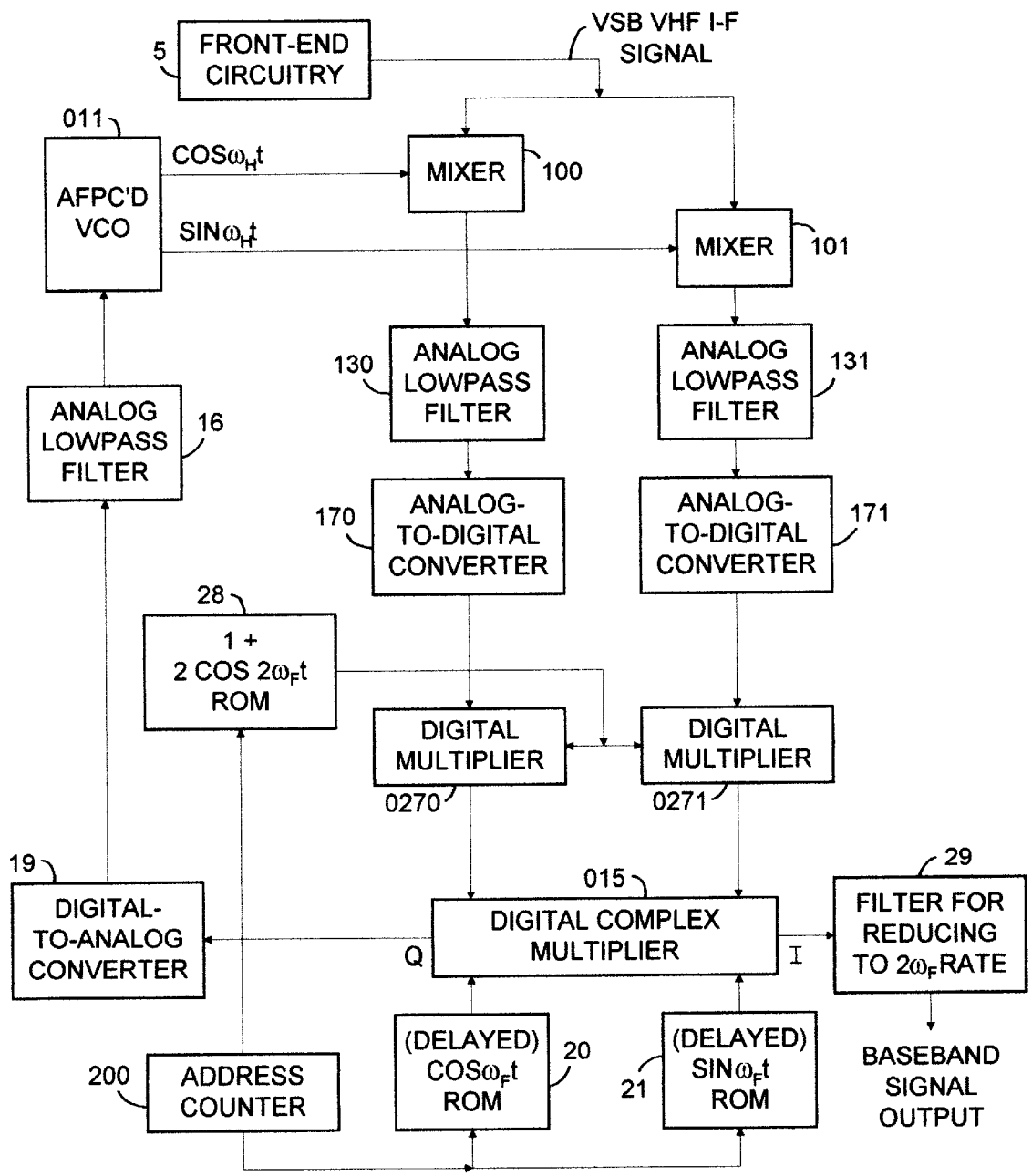
FIG. 5 is a schematic diagram of apparatus for demodulating a VSB signal with a digital complex multiplier after the VSB signal is converted to DSB AM signals by a complex down-conversion in accordance with an invention first disclosed herein.

FIG. 5 shows modifications made in accordance with the invention to the FIG. 2 portion of a VSB radio signal receiver. In FIG. 5 the digital adders 0260 and 0261 are deleted from the receiver. FIG. 5 also shows the ROM 28, which stores the look-up table for a 2 cos $2\omega_f t$ system function applied to the digital multipliers 0270 and 0271 as multiplicand input signals, being replaced with the read-only memory 028, which stores a look-up table for a 1+2 cos $2\omega_f t$ system function applied to the digital digital multipliers 0270 and 0271 as multiplicand input signals. The digital multiplier 0270 is connected in FIG. 5 to apply its product output signal directly to the digital complex multiplier 015 as the real component of its complex multiplicand input signal. The digital multiplier 0271 is connected in FIG. 5 to apply its product output signal directly to the digital complex multiplier 015 as the imaginary component of its complex multiplicand input signal.

Figure 6:
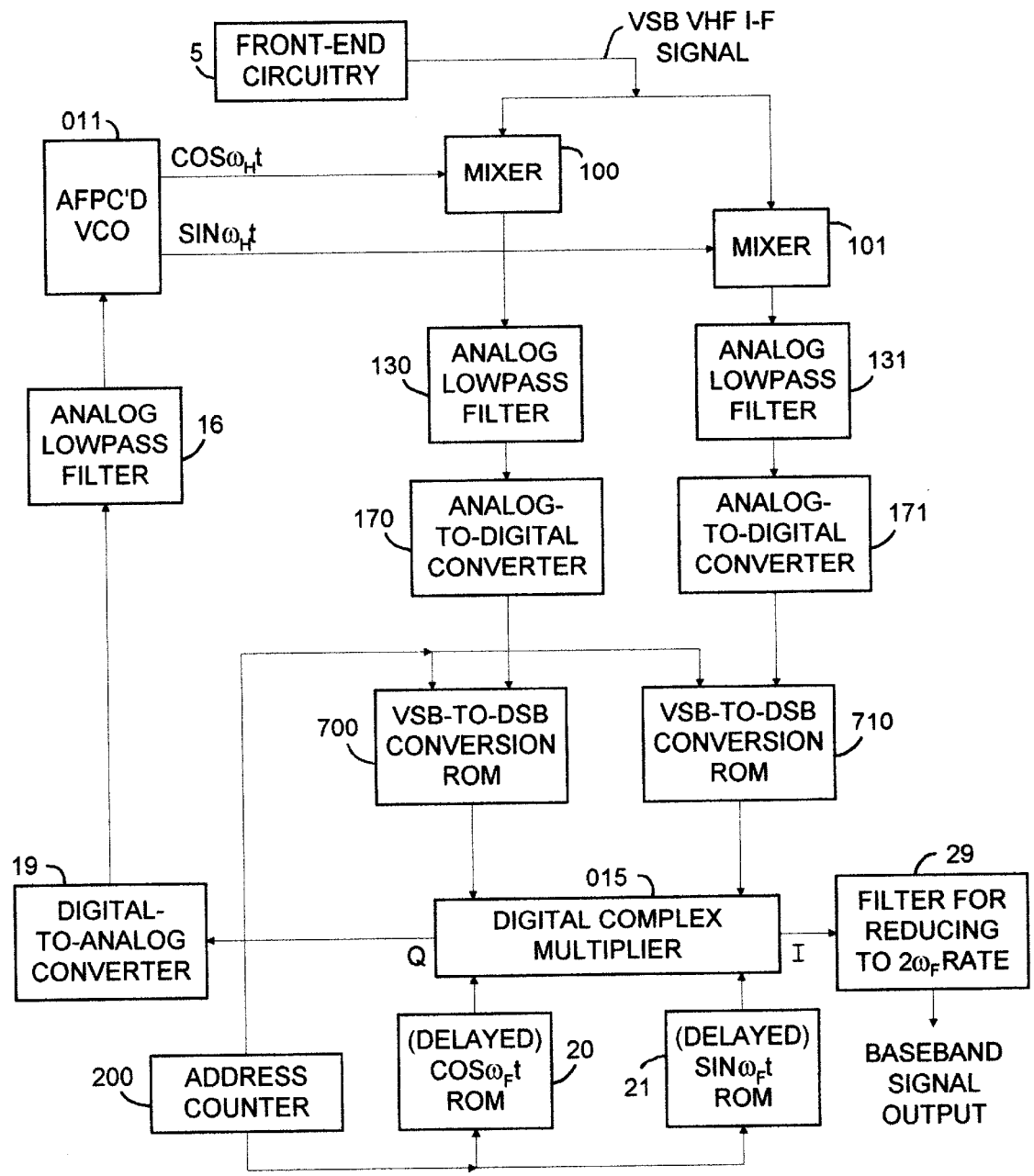
FIG. 6 is a block schematic diagram of a modification of the FIG. 5 apparatus for demodulating a VSB AM signal, which modified apparatus embodies an invention first disclosed herein.

FIG. 6 shows modifications made in accordance with the invention to the FIG. 2 portion of a VSB radio signal receiver. These modifications are alternative to the FIG. 5 modification of the FIG. 2 portion of a VSB radio signal receiver, but are more easily explained as modifications to the FIG. 5 portion of a VSB radio signal receiver. In certain embodiments of the FIG. 5 portion of a VSB radio signal receiver, the digital multipliers 0270 and 0271 can be constructed in read-only memory.

FIG. 6 shows the ROM 028 and the digital multiplier 0270 constructed in ROM being replaced by a single read-only memory 700 for converting digitized VSB final I-F signal from the ADC 170 to digitized DSB AM final I-F signal supplied to the digital complex multiplier 015 as the real component of its complex multiplicand input signal. The ROM 700 receives sample count from the address counter 200 as part of its input address and receives digitized VSB final I-F signal from the ADC 170 as the rest of its input address.

FIG. 6 further shows the ROM 028 and the digital multiplier 0271 constructed in ROM being replaced by a single read-only memory 710 for converting digitized VSB final I-F signal from the ADC 171 to digitized DSB AM final I-F signal supplied to the digital complex multiplier 015 as the imaginary component of its complex multiplicand input signal. The ROM 710 receives sample count from the address counter 200 as part of its input address and receives digitized VSB final I-F signal from the ADC 171 as the rest of its input address.

Figure 7:
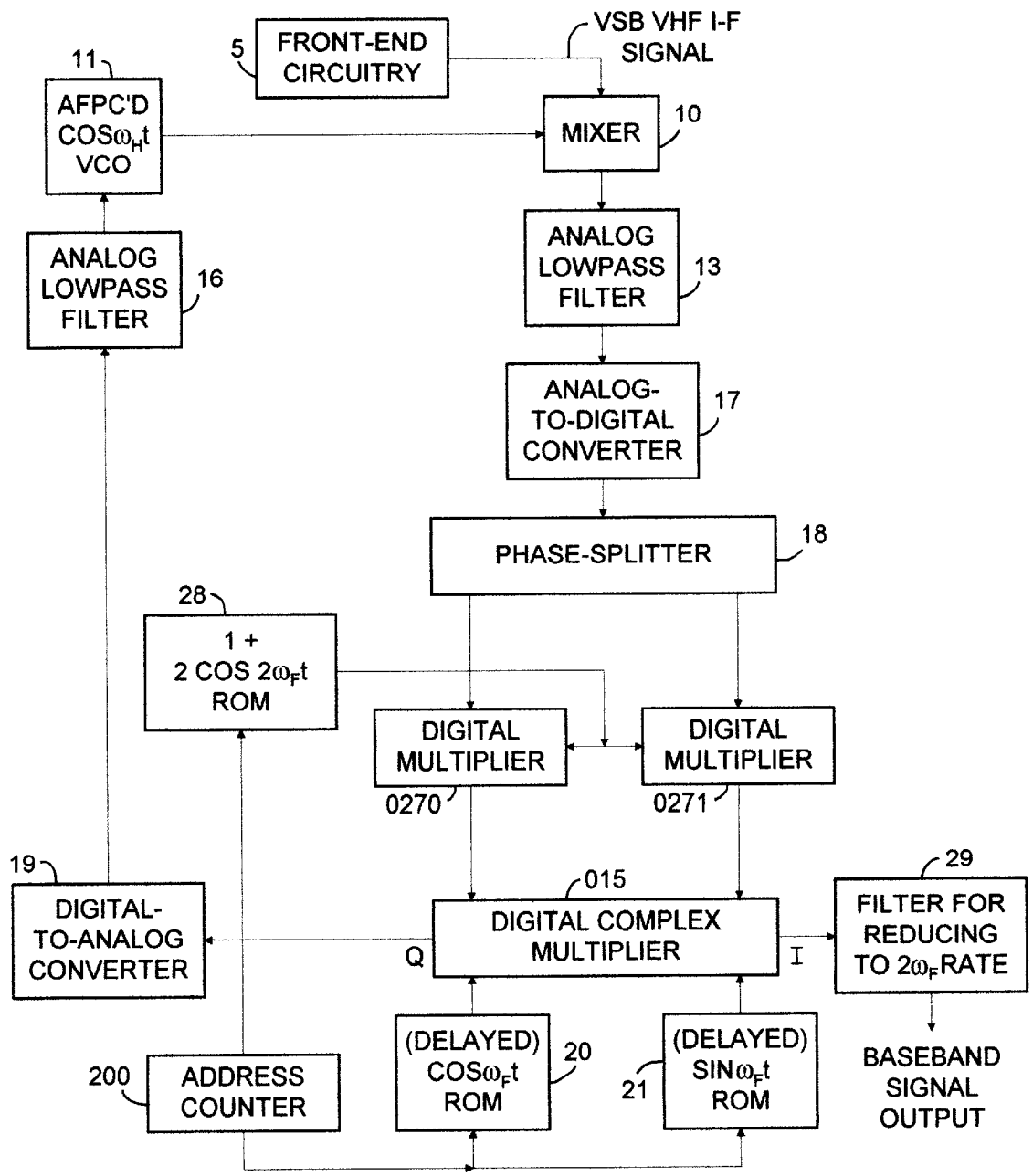
FIG. 7 is a schematic diagram of apparatus for demodulating a VSB signal with a digital complex multiplier after the VSB signal is phase-split and converted to DSB AM signals in accordance with an invention first disclosed herein.

FIG. 7 shows a variant of the FIG. 5 apparatus in which the digitized real VSB final I-F signal and the digitized imaginary VSB final I-F signal supplied as digital multiplicand signals for the digital multipliers 0270 and 0271, respectively, are not generated by complex downconversion. The controlled oscillator 011 supplying both in-phase and quadrature-phase controlled oscillations, the component mixers 100 and 101 composing a complex mixer, the lowpass filters 130 and 131, and the analog-to-digital converters 170 and 171 are not included in the FIG. 7 apparatus. The FIG. 7 apparatus includes the controlled oscillator 11 controlled oscillations in a single phasing, the mixer 10, the lowpass filter 130, and the single analog-to-digital converter 17 connected much as in the apparatuses of FIGS. 1, 3 and 4. The digitized VSB signal from the ADC 17 is utilized differently in the FIG. 7 apparatus, however, the ADC 17 being connected to apply its output signal to a phase-splitter 18 as input signal thereto. The phase-splitter 18 responds to the digitized VSB signal from the ADC 17 to supply digitized real VSB final I-F signal and connects to the digital multiplier 0270 to apply the digitized real VSB final I-F signal to the digital multiplier 0270 as its digital multiplicand input signal. The phase-splitter 18 also responds to the digitized VSB signal from the ADC 17 to supply digitized imaginary VSB final I-F signal and connects to the digital multiplier 0271 to apply the digitized imaginary VSB final I-F signal to the digital multiplier 0271 as its digital multiplicand input signal.

The phase-splitter 18 needs to maintain quadrature phase relationship between the digitized real VSB final I-F signal and the digitized imaginary VSB final I-F signal over a six-megahertz bandwidth. Since the phase-splitter 18 needs to maintain quadrature phase relationship between its output signals over only the six-megahertz bandwidth associated with the VSB final I-F signal, it is easier to design than the phase-splitter 014 in the apparatuses of FIGS. 3 and 4, which needs to maintain quadrature phase relationship between its output signals over the twelve-megahertz bandwidth associated with a DSB AM final I-F signal. Maintaining the quadrature phase relationship between the output signals of a phase-splitter is especially difficult as the output signals approach zero frequency. Choosing the nominal frequency of the controlled oscillations from the oscillator 11 such that the mixer 10 supplies a normal-spectrum VSB final I-F signal with its principal sideband above the carrier in frequency makes the phase-splitter 18 even easier to design than the phase-splitter 014 since its input signal is more remote from zero frequency. Furthermore, the range of frequencies over which quadrature phase relationship of output signals must be maintained is in relative frequency terms less than a 2:1 range for the phase-splitter 18, but is considerably larger for the phase-splitter 014 supposing the final I-F carrier frequency is between six and twelve megahertz. The simpler design for the phase-splitter 18 justifies having to use two digital multipliers 0270 and 0271 in the FIG. 7 apparatus as compared to the single digital multiplier 027 in the FIG. 3 apparatus.

Figure 8:
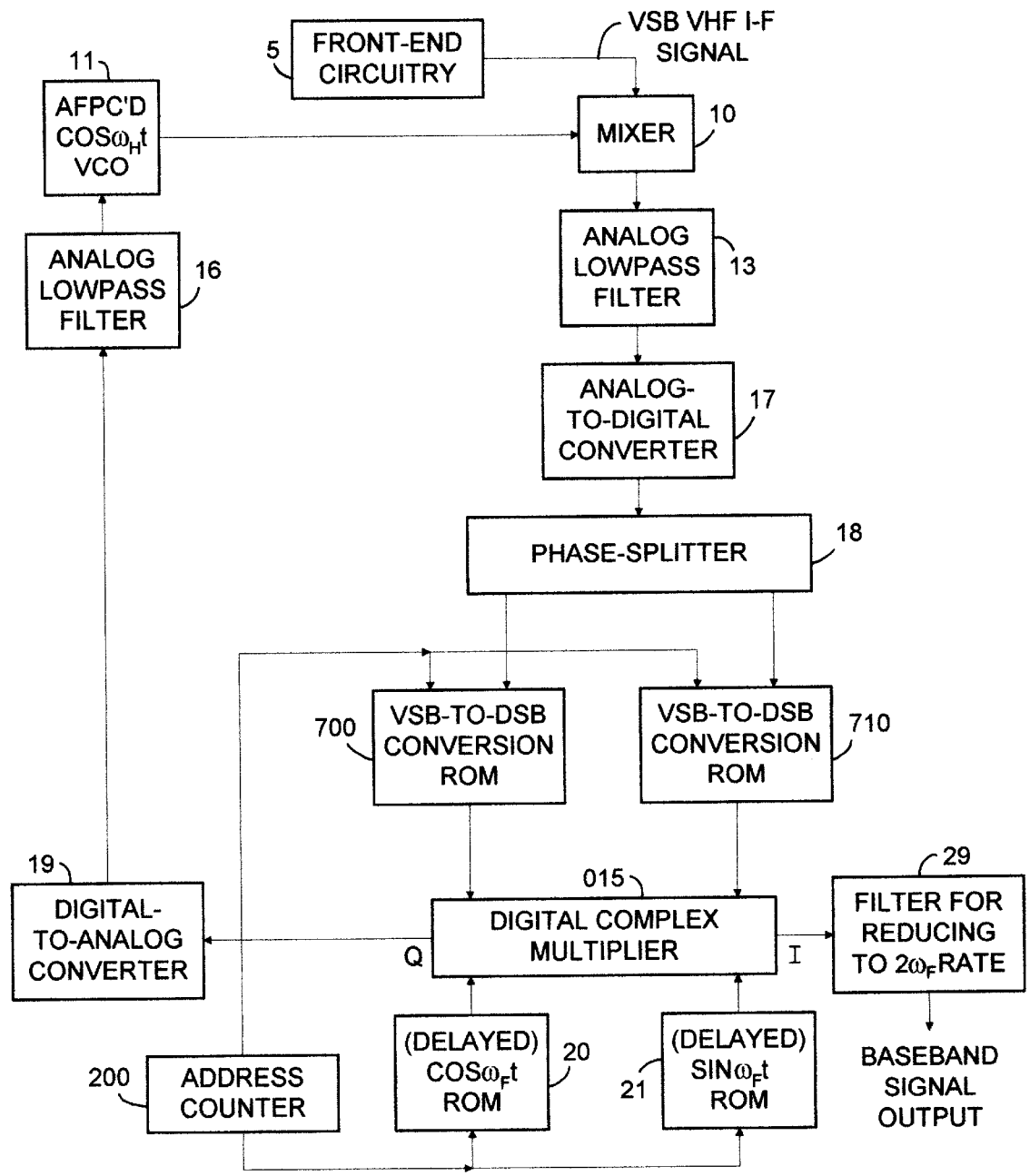
FIG. 8 is a block schematic diagram of a modification of the FIG. 7 apparatus for demodulating a VSB AM signal, which modified apparatus embodies an invention first disclosed herein.

FIG. 8 shows modifications made in accordance with the invention to the FIG. 2 portion of a VSB radio signal receiver. These modifications are alternative to the FIG. 7 modification of the FIG. 2 portion of a VSB radio signal receiver, but are more easily explained as modifications to the FIG. 7 portion of a VSB radio signal receiver. In certain embodiments of the FIG. 7 portion of a VSB radio signal receiver, the digital multipliers 0270 and 0271 can be constructed in read-only memory.

FIG. 8 shows the ROM 028 and the digital multiplier 0270 constructed in ROM being replaced by a single read-only memory 700 for converting digitized real VSB final I-F signal from the phase-splitter 18 to digitized real DSB AM final I-F signal supplied to the digital complex multiplier 015 as the real component of its complex multiplicand input signal. The ROM 700 receives sample count from the address counter 200 as part of its input address and receives digitized real VSB final I-F signal from the phase-splitter 18 as the rest of its input address.

FIG. 8 further shows the ROM 028 and the digital multiplier 0271 constructed in ROM being replaced by a single read-only memory 710 for converting digitized imaginary VSB final I-F signal from the phase-splitter 18 to digitized imaginary DSB AM final I-F signal supplied to the digital complex multiplier 015 as the imaginary component of its complex multiplicand input signal. The ROM 710 receives sample count from the address counter 200 as part of its input address and receives digitized imaginary VSB final I-F signal from the phase-splitter 18 as the rest of its input address.

FIGS. 9A, 9B, 9C and 9D are frequency spectrum plots against the same frequency abscissa showing a first way of downconverting a VSB AM signal to a DSB AM signal and then demodulating it to recover baseband signal. In this first way of conducting the downconversion the frequency of the controlled oscillator 14 is such that final I-F signal before its conversion to a DSB AM signal is a reverse-spectrum signal 80 as shown in FIG. 9A. This reverse-spectrum signal 80, which will be used as the lower sideband of the DSB AM signal, results from the mixing procedure in the mixer 10 of FIGS. 1, 3 and 4. Such reverse-spectrum signals also result from the mixing procedures in the mixers 101 and 101 of FIGS. 2, 5 and 6.

FIG. 9B shows the result of multiplicatively mixing the FIG. 9A reverse-spectrum signal 80 with a carrier at frequency $2f_F$, twice the final I-F frequency $f_F$. A normal-spectrum signal 81 with carrier frequency $f_F$ is generated as the difference of the FIG. 9A reverse-spectrum signal 80 from the carrier frequency $2f_F$ with which it is multiplicatively mixed. A reverse-spectrum signal 82 with carrier frequency $3f_F$ is generated as the sum of the FIG. 9A reverse-spectrum signal 80 with the carrier frequency $2f_F$ with which it is multiplicatively mixed.

FIG. 9C shows the result of combining the frequency spectra of FIGS. 9A and 9B to generate a DSB AM signal 83 formed from the merger of the reverse-spectrum signal 80 with the normal-spectrum signal 81. The reverse-spectrum signal 82 accompanies the DSB AM signal 83 in FIG. 9C. The DSB AM signal 83 extends upward in frequency towards frequency $2f_F$. The reverse-spectrum signal 82 extends downward in frequency towards frequency $2f_F$, which tends to make the reverse-spectrum signal 82 somewhat difficult to separate from the DSB AM signal 83 by frequency-selective filtering.

FIG. 9D shows the result of multiplicatively mixing the FIG. 9C signal with a carrier at the final I-F frequency $f_F$ in a synchrodyning procedure used to recover a baseband spectrum signal 84. The baseband spectrum signal 84 is accompanied by a reverse-spectrum signal 85 resulting from the downconversion of the reverse-spectrum signal 82 per FIG. 9C in the synchrodyning procedure used to recover the baseband spectrum signal 84. The baseband spectrum signal 84 extends upward in frequency towards frequency $f_F$. The reverse-spectrum signal 85 extends downward in frequency towards frequency $f_F$, which tends to make the reverse-spectrum signal 85 somewhat difficult to separate from the baseband spectrum signal 84 by frequency-selective filtering.

FIGS. 10A, 10B, 10C and 10D are frequency spectrum plots against the same frequency abscissa showing a second way of downconverting a VSB AM signal to a DSB AM signal and then demodulating it to recover baseband signal. In this second way of conducting the downconversion the frequency of the controlled oscillator 14 is such that final I-F signal before its conversion to a DSB AM signal is a normal-spectrum signal 90 as shown in FIG. 10A. This normal-spectrum signal 90, which will be used as the upper sideband of the DSB AM signal, results from the mixing procedure in the mixer 10 of FIGS. 1, 3 and 4. Such normal-spectrum signals also result from the mixing procedures in the mixers 101 and 101 of FIGS. 2, 5 and 6.

FIG. 10B shows the result of multiplicatively mixing the FIG. 10A normal-spectrum signal 90 with a carrier at frequency $2f_F$, twice the final I-F frequency $f_F$. A reverse-spectrum signal 91 with carrier frequency $f_F$ is generated as the difference of the FIG. 9A normal-spectrum signal 90 from the carrier frequency $2f_F$ with which it is multiplicatively mixed. A normal-spectrum signal 92 with carrier frequency $3f_F$ is generated as the sum of the FIG. 10A normal-spectrum signal 90 with the carrier frequency $2f_F$ with which it is multiplicatively mixed.

FIG. 10C shows the result of combining the frequency spectra of FIGS. 10A and 10B to generate a DSB AM signal 93 formed from the merger of the normal-spectrum signal 90 with the reverse-spectrum signal 91. The normal-spectrum signal 92 accompanies the DSB AM signal 93 in FIG. 10C. The DSB AM signal 93 extends upward in frequency towards frequency $2f_F$. The normal-spectrum signal 92 extends upward in frequency from a frequency slightly below the frequency $3f_F$, which makes separating the DSB AM signal 93 from the normal-spectrum signal 92 by frequency-selective filtering easier than separating the DSB AM signal 83 from the reverse-spectrum signal 82 in FIG. 9C.

FIG. 10D shows the result of multiplicatively mixing the FIG. 10C signal with a carrier at the final I-F frequency $f_F$ in a synchrodyning procedure used to recover a baseband spectrum signal 94. The baseband spectrum signal 94 is accompanied by a normal-spectrum signal 95 resulting from the downconversion of the normal-spectrum signal 92 per FIG. 9C in the synchrodyning procedure used to recover the baseband spectrum signal 94. The baseband spectrum signal 94 extends upward in frequency towards frequency $f_F$. The normal-spectrum signal 95 extends upward in frequency from a frequency slightly below the frequency $3f_F$, which tends to make makes separating the baseband spectrum signal 94 from the normal-spectrum signal 95 by frequency-selective filtering easier than separating the baseband spectrum signal 84 from the reverse-spectrum signal 85 in FIG. 9D.

The apparatuses shown in FIGS. 3–8 can each be succeeded by adaptive filtering designed to perform baseband equalization and echo-suppression. In alternative embodiments of the invention, the apparatuses of FIGS. 3, 4, 7 and 8 are modified to interpose after the ADC 17 adaptive filtering for implementing passband equalization and echo-suppression. In other embodiments of the invention, the apparatuses of FIGS. 5 and 6 are modified modified to interpose after the ADCs 170 and 171 adaptive filtering for implementing complex passband equalization and echo-suppression. The analog lowpass filter 16 must have very narrowband width and must be carefully designed to avoid excess phase shift in the loop that generates automatic frequency and phase control signal as the lowpass filter 16 response. This is because the latent delay of the adaptive filtering contributes to phase shift in the loop.

While the invention has been described in the particular context of DTV receivers, it should be appreciated that the invention is useful, as well, for the reception of VSB radio signals used in other types of communications.

What is claimed is:

1. A method for converting a vestigial sideband amplitude-modulation signal to a double-sideband amplitude-modulation signal containing similar information, said method comprising the concurrent steps of:

mixing said vestigial sideband amplitude-modulation signal with a beat frequency different from the frequency of its own carrier, said beat frequency being of such value as to generate a mixing result that is translated in frequency to have its carrier at an offset frequency that is higher than zero frequency;

digitizing said mixing result to generate a digital multiplicand signal; and multiplying said digital multiplicand signal by a digital multiplier signal descriptive of a system function composed of a constant term and a second harmonic of said offset frequency for generating a digital product signal descriptive of said double-sideband amplitude-modulation signal.

2. A method for extracting information from a vestigial sideband amplitude-modulation signal generated in accordance with a modulating signal, said method for extracting information from said vestigial sideband amplitude-modulation signal comprising the steps of the method of claim 1 for converting said vestigial sideband amplitude-modulation signal to said double-sideband amplitude-modulation signal containing similar information, and said method for extracting information from said vestigial sideband amplitude-modulation signal further comprising the step of detecting the information contained in said double-sideband amplitude-modulation signal.

3. Apparatus for performing the method of claim 1 in a receiver for vestigial-sideband radio-frequency signal amplitude-modulated in accordance with plural-level digital modulation symbols and accompanied by a pilot carrier, said apparatus comprising:

a receiver front end for converting a received vestigial-sideband signal to an amplified vestigial-sideband signal in a penultimate intermediate-frequency band;

a controlled oscillator for generating controlled oscillations the frequency and phase of which are controlled by an automatic frequency and phase control signal;

circuitry for generating said automatic frequency and phase control signal from a quadrature-phase baseband signal obtained from detecting the amplitude modulation of said vestigial-sideband radio-frequency signal accompanied by a pilot carrier;

a mixer, with a connection from said controlled oscillator for supplying said mixer with said controlled oscillations, and with a connection from said receiver front end for supplying said mixer with said amplified vestigial-sideband signal in a penultimate intermediate-frequency band, said mixer of a type for multiplicatively mixing said controlled oscillations with said amplified vestigial-sideband signal in a penultimate intermediate-frequency band to generate an amplified vestigial-sideband signal in a final intermediate-frequency band;

a final-intermediate-frequency-band selection filter connected after said mixer for supplying in said final intermediate-frequency band a response to said amplified vestigial-sideband signal separated from its image;

an analog-to-digital converter connected to receive the response of said final-intermediate-frequency-band selection filter and to digitize such response to supply said digital multiplicand signal;

multiplier circuitry for multiplying said digital multiplicand signal by said digital multiplier signal descriptive of said system function composed of a constant term and a second harmonic of said offset frequency for generating said digital product signal descriptive of said double-sideband amplitude-modulation signal;

a phase-splitter connected to receive said digital product signal as input signal and to supply as output signal real and imaginary components of a digitized final-intermediate-frequency double-sideband amplitude-modulation signal;

a digital complex multiplier connected to receive the output signal from said phase-splitter as a complex multiplicand input signal, said digital complex multiplier further connected for multiplying said complex multiplicand input signal by a complex multiplier input signal descriptive of said offset frequency, said digital complex multiplier being conditioned by being so connected for supplying a complex product output signal composed of said quadrature-phase baseband signal and an in-phase baseband signal supplied to remaining portion of said receiver.

4. The apparatus of claim 3, wherein said multiplier circuitry for multiplying said digital multiplicand signal by said digital multiplier signal descriptive of said system function composed of a constant term and a second harmonic of said offset frequency for generating said digital product signal descriptive of said double-sideband amplitude-modulation signal comprises:

a digital multiplier connected to receive said digital multiplicand signal from said analog-to-digital converter and connected to supply said digital product signal descriptive of said double-sideband amplitude-modulation signal to said phase-splitter as input signal thereto;

an address counter for generating addresses by counting the samples of the response of said final-intermediate-frequency-band selection filter that said analog-to-digital converter digitizes; and read-only memory connected to receive the addresses generated by said address counter, programmed for responding to said addresses to generate said digital multiplier signal descriptive of said system function composed of a constant term and a second harmonic of said offset frequency, and connected to said digital multiplier for supplying it said digital multiplier signal for multiplying with said digital multiplicand signal to generate said digital product signal descriptive of said double-sideband amplitude-modulation signal.

5. The apparatus of claim 3, wherein said multiplier circuitry for multiplying said digital multiplicand signal by said digital multiplier signal descriptive of said system function composed of a constant term and a second harmonic of said offset frequency for generating said digital product signal descriptive of said double-sideband amplitude-modulation signal comprises:

an address counter for generating partial addresses by counting the samples of the response of said final-intermediate-frequency-band selection filter that said analog-to-digital converter digitizes; and read-only memory connected to receive the partial addresses generated by said address counter, programmed for responding to said partial addresses and to said digital multiplicand signal from said analog-to-digital converter as further partial addresses to generate said digital product signal descriptive of said double-sideband amplitude-modulation signal, and connected to supply said digital product signal descriptive of said double-sideband amplitude-modulation signal to said phase-splitter as input signal thereto.

6. Apparatus for performing the method of claim 1 in a receiver for vestigial-sideband radio-frequency signal amplitude-modulated in accordance with plural-level digital modulation symbols and accompanied by a pilot carrier, said apparatus comprising:

a receiver front end for converting a received vestigial-sideband signal to an amplified vestigial-sideband signal in a penultimate intermediate-frequency band;

a controlled oscillator for generating in-phase and quadrature-phase controlled oscillations, the frequency and phases of which said controlled oscillations are controlled by an automatic frequency and phase control signal;

circuitry for generating said automatic frequency and phase control signal from a quadrature-phase baseband signal obtained from detecting the amplitude modulation of said vestigial-sideband radio-frequency signal accompanied by a pilot carrier;

a first mixer, with a connection from said controlled oscillator for supplying said first mixer with said in-phase controlled oscillations, and with a connection from said receiver front end for supplying said first mixer with said amplified vestigial-sideband signal in a penultimate intermediate-frequency band, said first mixer of a type for multiplicatively mixing said in-phase controlled oscillations with said amplified vestigial-sideband signal in a penultimate intermediate-frequency band to generate a first amplified vestigial-sideband signal in a final intermediate-frequency band;

a first final-intermediate-frequency-band selection filter connected after said first mixer for supplying in a final intermediate-frequency band a response to said first amplified vestigial-sideband signal separated from the image thereof;

a first analog-to-digital converter connected to receive the response of said first final-intermediate-frequency-band selection filter and to digitize such response to supply a first digital multiplicand signal;

first multiplier circuitry for multiplying said first digital multiplicand signal by a digital multiplier signal descriptive of said system function composed of a constant term and a second harmonic of said offset frequency for generating a first digital product signal descriptive of a real component of a digitized final-intermediate-frequency double-sideband amplitude-modulation signal;

a second mixer, with a connection from said controlled oscillator for supplying said second mixer with said quadrature-phase controlled oscillations, and with a connection from said receiver front end for supplying said second mixer with said amplified vestigial-sideband signal in a penultimate intermediate-frequency band, said second mixer of a type for multiplicatively mixing said quadrature-phase controlled oscillations with said amplified vestigial-sideband signal in a penultimate intermediate-frequency band to generate a second amplified vestigial-sideband signal in said final intermediate-frequency band;

a second final-intermediate-frequency-band selection filter connected after said second mixer for supplying in said final intermediate-frequency band a response to said second amplified vestigial-sideband signal separated from the image thereof;

a second analog-to-digital converter connected to receive the response of said second final-intermediate-frequency-band selection filter and to digitize such response to supply a second digital multiplicand signal;

second multiplier circuitry for multiplying said second digital multiplicand signal by said digital multiplier signal descriptive of said system function composed of a constant term and a second harmonic of said offset frequency for generating a second digital product signal descriptive of an imaginary component of a digitized final-intermediate-frequency double-sideband amplitude-modulation signal; and a digital complex multiplier connected to receive as a complex multiplicand input signal said first and second digital product signals as supplied respectively from said first multiplier circuitry and from said second multiplier circuitry, said digital complex multiplier further connected for multiplying said complex multiplicand input signal by a complex multiplier input signal descriptive of said offset frequency, said digital complex multiplier being conditioned by being so connected for supplying a complex product output signal composed of said quadrature-phase baseband signal and an in-phase baseband signal supplied to remaining portion of said receiver.

7. The apparatus of claim 6, wherein said first multiplier circuitry and said second multiplier circuitry together comprise:

a first digital multiplier connected to receive said first digital multiplicand signal from said first analog-to-digital converter and connected to supply said digital complex multiplier said real component of said digitized final-intermediate-frequency double-sideband amplitude-modulation signal as the real component of said complex multiplicand input signal;

a second digital multiplier connected to receive said second digital multiplicand signal from said second analog-to-digital converter and connected to supply said digital complex multiplier said imaginary component of said digitized final-intermediate-frequency double-sideband amplitude-modulation signal as the imaginary component of said complex multiplicand input signal;

an address counter for generating addresses by counting the samples of the response of said final-intermediate-frequency-band selection filter that each of said first and second analog-to-digital converters digitizes; and read-only memory connected to receive the addresses generated by said address counter, programmed for responding to said addresses to generate said digital multiplier signal descriptive of a system function composed of a constant term and a second harmonic of said offset frequency, and connected to said first and second digital multipliers for supplying each said digital multiplier signal descriptive of said system function composed of a constant term and a second harmonic of said offset frequency.

8. The apparatus of claim 6, wherein said multiplier circuitry for multiplying said digital multiplicand signal by a digital multiplier signal descriptive of said system function composed of a constant term and a second harmonic of the carrier frequency offset from zero frequency for generating a digital product signal descriptive of said double-sideband amplitude-modulation signal comprises:

an address counter for generating addresses by counting the samples of the response of said final-intermediate-frequency-band selection filter that each of said first and second analog-to-digital converters digitizes; and first read-only memory connected to receive the partial addresses generated by said address counter, programmed for responding to said partial addresses and to said first digital multiplicand signal from said first analog-to-digital converter as further partial addresses to generate said first digital product signal descriptive of said real component of said double-sideband amplitude-modulation signal, and connected to supply said digital complex multiplier said real component of said digitized final-intermediate-frequency double-sideband amplitude-modulation signal as the real component of said complex multiplicand input signal; and second read-only memory connected to receive the partial addresses generated by said address counter, programmed for responding to said partial addresses and to said second digital multiplicand signal from said second analog-to-digital converter as further partial addresses to generate said second digital product signal descriptive of said imaginary component of said double-sideband amplitude-modulation signal, and connected to supply said digital complex multiplier said imaginary component of said digitized final-intermediate-frequency double-sideband amplitude-modulation signal as the imaginary component of said complex multiplicand input signal.

9. Apparatus for performing the method of claim 1 in a receiver for vestigial-sideband radio-frequency signal amplitude-modulated in accordance with plural-level digital modulation symbols and accompanied by a pilot carrier, said apparatus comprising:

a receiver front end for converting a received vestigial-sideband signal to an amplified vestigial-sideband signal in a penultimate intermediate-frequency band;

a controlled oscillator for generating controlled oscillations the frequency and phase of which are controlled by an automatic frequency and phase control signal;

circuitry for generating said automatic frequency and phase control signal from a quadrature-phase baseband signal obtained from detecting the amplitude modulation of said vestigial-sideband radio-frequency signal accompanied by a pilot carrier;

a mixer, with a connection from said controlled oscillator for supplying said mixer with said controlled oscillations, and with a connection from said receiver front end for supplying said mixer with said amplified vestigial-sideband signal in a penultimate intermediate-frequency band, said mixer of a type for multiplicatively mixing said controlled oscillations with said amplified vestigial-sideband signal in a penultimate intermediate-frequency band to generate an amplified vestigial-sideband signal in a final intermediate-frequency band;

a final-intermediate-frequency-band selection filter connected after said mixer for supplying in said final intermediate-frequency band a response to said amplified vestigial-sideband signal separated from its image;

an analog-to-digital converter connected to receive the response of said final-intermediate-frequency-band selection filter and to digitize such response to supply a digitized final-intermediate-frequency-band selection filter response;

a phase-splitter connected to receive said digitized final-intermediate-frequency-band selection filter response as its input signal from said analog-to-digital converter and to supply as output signal real and imaginary components of a digitized vestigial-sideband final-intermediate-frequency signal;

first multiplier circuitry for multiplying a first digital multiplicand signal by said digital multiplier signal descriptive of said system function composed of a constant term and a second harmonic of said offset frequency for generating a first digital product signal, said phase-splitter being connected to apply said real component of said digitized vestigial-sideband final-intermediate-frequency signal to said first multiplier circuitry as said first digital multiplicand signal for causing said first digital product signal to be descriptive of a real component of a digitized final-intermediate-frequency double-sideband amplitude-modulation signal;

second multiplier circuitry for multiplying a second digital multiplicand signal by said digital multiplier signal descriptive of said system function composed of a constant term and a second harmonic of said offset frequency for generating a second digital product signal, said phase-splitter being connected to apply said imaginary component of said digitized vestigial-sideband final-intermediate-frequency signal to said second multiplier circuitry as said second digital multiplicand signal for causing said second digital product signal to be descriptive of an imaginary component of a digitized final-intermediate-frequency double-sideband amplitude-modulation signal; and a digital complex multiplier connected to receive as a complex multiplicand input signal said first and second digital product signals as supplied respectively from said first multiplier circuitry and from said second multiplier circuitry, said digital complex multiplier further connected for multiplying said complex multiplicand input signal by a complex multiplier input signal descriptive of said offset frequency, said digital complex multiplier being conditioned by being so connected for supplying a complex product output signal composed of said quadrature-phase baseband signal and an in-phase baseband signal supplied to remaining portion of said receiver.

10. The apparatus of claim 9, wherein said first multiplier circuitry and said second multiplier circuitry together comprise:

a first digital multiplier connected to receive said first digital multiplicand signal from said first analog-to-digital converter and connected to supply said digital complex multiplier said real component of said digitized final-intermediate-frequency double-sideband amplitude-modulation signal as the real component of said complex multiplicand input signal;

a second digital multiplier connected to receive said second digital multiplicand signal from said second analog-to-digital converter and connected to supply said digital complex multiplier said imaginary component of said digitized final-intermediate-frequency double-sideband amplitude-modulation signal as the imaginary component of said complex multiplicand input signal;

an address counter for generating addresses by counting the samples of the response of said final-intermediate-frequency-band selection filter that each of said first and second analog-to-digital converters digitizes; and read-only memory connected to receive the addresses generated by said address counter, programmed for responding to said addresses to generate said digital multiplier signal descriptive of said system function composed of a constant term and a second harmonic of said offset frequency, and connected to said first and second digital multipliers for supplying each said digital multiplier signal descriptive of said system function composed of a constant term and a second harmonic of said offset frequency.

11. The apparatus of claim 9, wherein said multiplier circuitry for multiplying said digital multiplicand signal by a digital multiplier signal descriptive of said system function composed of a constant term and a second harmonic of said offset frequency for generating a digital product signal descriptive of said double-sideband amplitude-modulation signal comprises:

an address counter for generating addresses by counting the samples of the response of said final-intermediate-frequency-band selection filter that each of said first and second analog-to-digital converters digitizes; and first read-only memory connected to receive the partial addresses generated by said address counter, programmed for responding to said partial addresses and to said first digital multiplicand signal from said first analog-to-digital converter as further partial addresses to generate said first digital product signal descriptive of said real component of said double-sideband amplitude-modulation signal, and connected to supply said digital complex multiplier said real component of said digitized final-intermediate-frequency double-sideband amplitude-modulation signal as the real component of said complex multiplicand input signal; and second read-only memory connected to receive the partial addresses generated by said address counter, programmed for responding to said partial addresses and to said second digital multiplicand signal from said second analog-to-digital converter as further partial addresses to generate said second digital product signal descriptive of said imaginary component of said double-sideband amplitude-modulation signal, and connected to supply said digital complex multiplier said imaginary component of said digitized final-intermediate-frequency double-sideband amplitude-modulation signal as the imaginary component of said complex multiplicand input signal.

* * * * *